United States Patent [19]

Neuray et al.

[11] Patent Number: 4,460,752
[45] Date of Patent: Jul. 17, 1984

[54] REACTING POLYCARBONATE RESIN WITH ARYL CHLOROCARBONATE TO IMPROVE AGING CHARACTERISTICS

[75] Inventors: Dieter Neuray; Dieter Margotte, both of Krefeld, Fed. Rep. of Germany; Erhard Tresper, Baytown, Tex.; Günter Jacobs, Krefeld, Fed. Rep. of Germany

[73] Assignee: Bayer Aktiengesellschaft, Leverkusen, Fed. Rep. of Germany

[21] Appl. No.: 436,473

[22] Filed: Oct. 25, 1982

[30] Foreign Application Priority Data

Oct. 31, 1981 [DE]  Fed. Rep. of Germany ....... 3143252

[51] Int. Cl.$^3$ .............................................. C08G 63/62
[52] U.S. Cl. ................................... 525/462; 528/171; 528/198
[58] Field of Search ................. 525/462; 528/198, 171

[56] References Cited

U.S. PATENT DOCUMENTS

| | | | |
|---|---|---|---|
| 3,475,373 | 10/1969 | Jackson, Jr. et al. | 260/47 |
| 4,059,565 | 11/1977 | Yoshizaki et al. | 260/47 |
| 4,097,457 | 6/1978 | Megumi et al. | 260/47 |
| 4,230,548 | 10/1980 | Adelmann et al. | 204/159.14 |

FOREIGN PATENT DOCUMENTS

| | | |
|---|---|---|
| 1103840 | 6/1981 | Canada. |
| 1544788 | 4/1979 | United Kingdom. |

*Primary Examiner*—Harlod D. Anderson
*Attorney, Agent, or Firm*—Gene Harsh; Lawrence S. Pope; Aron Preis

[57] ABSTRACT

A process for the preparation of polycarbonates from diphenols and/or chlorocarbonic acid esters thereof and phosgene by the two-phase boundary process wherein said polycarbonate is reacted with aryl chlorocarbonate is disclosed; the reaction products are noted for their improved ageing and hydrolysis characteristics which render them useful as thermoplastic molding compositions.

8 Claims, No Drawings

REACTING POLYCARBONATE RESIN WITH ARYL CHLOROCARBONATE TO IMPROVE AGING CHARACTERISTICS

The present invention relates to a process for the production of a polycarbonate having a mean molecular weight (weight average) $\overline{M}_w$ of at least 10,000 in which a polycarbonate which has been prepared from a diphenol of the general formula $$HO-Z-OH \qquad (I)$$

in which

Z is a divalent aromatic radical which preferably contains 6–30 C atoms,
and/or chlorocarbonic acid esters thereof, with the addition of 0.1–8 mol%, preferably 0.5–5 mol%, relative to mols of structural units Z, of phenol or a substituted monophenol, phosgene and, if appropriate, a branching agent, by the two-phase boundary process, and which has been dissolved in the organic phase, is reacted, after the aqueous alkaline phase has been separated off and before the acidic wash, with 0.1–1 mol %, preferably 0.15–0.5 mol%, relative to moles of structural units Z in each case, of an aryl chlorocarbonate of the general formula

in which

Ar denotes a monovalent aromatic radical, preferably a phenyl radical or an alkylphenyl radical having 1–18 C atoms in the alkyl radical.

The present invention also relates to the polycarbonates obtainable by the process according to the invention.

The polycarbonates prepared by the process according to the invention have weight average molecular weights ($\overline{M}_w$) of at least 10,000, in particular from 10,000 to 200,000, and particularly preferably from 20,000 to 80,000 (determined by gel chromatography after prior calibration), and correspond to the structural formula (III)

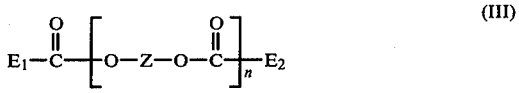

in which $E_1$ and $E_2$ are identical or different and correspond to an optionally substituted aryloxy radical, Z represents a divalent aromatic radical from formula (I), and n is the degree of polycondensation resulting from the mean molecular weight $\overline{M}_w$ of the polycarbonates of at least 10,000 or 10,000 to 200,000 or 20,000 to 80,000, respectively.

Compared to corresponding polycarbonates prepared without subsequent reaction with aryl chlorocarbonates of the formula (II), the polycarbonates obtainable by the process according to the invention have a substantially lower content of free phenolic OH groups and thus a substantially improved stability to ageing and improved hydrolysis characteristics.

The preparation of aromatic polycarbonates by the phase boundary process using acid-chlorides as chain interrupters is known (see, for example our DE-OS (German Published Specification) No. 2,620,256, our DE-OS (German Published Specification) No. 2,716,304, our DE-OS (German Published Specification) No. 2,746,139 and Japanese Published Patent Application No. 34,992/76).

The polycarbonates obtainable by processes of this type have a content of terminal phenolic OH groups of about 100 to 500 ppm (about 0.01 to 0.05% by weight), depending on the molecular weight.

As is known, however, phenolic OH groups have a disadvantageous effect on the thermal and hydrolytic stability of the thermoplastic aromatic polycarbonates, and this makes the addition of suitable stabilisers necessary. In contrast, the thermoplastic polycarbonates obtainable according to the invention manage without or with substantially smaller amounts of thermostabilisers or hydrolysis stabilisers.

U.S. Pat. No. 3,475,373 describes a process for the preparation of OH group-free polycarbonates, which comprises preparing polycarbonates which have terminal phenolic OH and chlorocarbonic acid ester groups, by reacting bisphenols with phosgene and/or bischlorocarbonic acid esters, in a 1st stage, without the use of monofunctional chain interrupters. In a 2nd reaction stage, the terminal phenolic groups present are first reacted with acid-chlorides or chlorocarbonic acid esters, a reaction time of 15–30 minutes being chosen in order to complete the reaction. Excess acid-chloride or chlorocarbonic acid ester, and terminal chlorocarbonic acid ester groups of the polycarbonate, are then brought to reaction, in a 3rd stage, by reaction with monohydroxy compounds.

However, this process has a number of disadvantages:

1. Since they have been prepared without chain limiters, the polycarbonates obtained after the first stage and having terminal OH and O—COCl groups are not very uniform and thus have substantially poorer properties, for example poor flow properties.

2. The reaction time of 15–30 minutes for the reaction of the phenolic OH content is very long and thus uneconomical.

3. Excess acid-chloride or excess chlorocarbonic acid ester must be trapped with alcohols or phenols.

On the other hand, it was not obvious that the reaction, according to the invention, with the aryl chlorocarbonate would take place very much more rapidly and without the 3rd stage. It was also not obvious that chlorocarbonic acid esters but not acid-chlorides, such as benzoyl chloride, would have the action according to the invention (see Comparative Example).

The provision of aromatic polycarbonates having a substantially lower phenolic OH content compared with the prior art is thus economically achieved by the process according to the invention, without losses of properties.

The process according to the invention comprises a procedure in which a polycarbonate prepared in a customary manner by the two-phase boundary process, from diphenols of the formula (I), with the addition of chain regulators, is subsequently reacted, after the condensation and before the working-up, with 0.1–1 mol %, preferably 0.15–0.5 mol% of an aryl chlorocarbonate of the formula (II), relative to mols of structural units Z.

The amount of chlorocarbonic acid ester depends primarily on the content of free terminal phenolic OH groups in the polycarbonate after the polycondensation. It has proved to be sufficient when 1–2 moles of chlorocarbonic acid ester are added per mol of terminal phenolic OH group. Although the content of phenolic OH is also reduced when less than the theoretically required amount is added, this reduction is not as substantial as with the theoretical amount or with excess chlorocarbonic acid ester. When more than twice the molar amount of chlorocarbonic acid ester is added, the phenolic OH content is further reduced only to a small extent.

Generally the reaction with the aryl chlorocarbonate is carried out as follows: The aryl chlorocarbonate, dissolved in a solvent or solvent mixture customary for polycarbonate, for example methylene chloride, toluene or chlorobenzene, is added to the organic solution of the polycarbonate after the aqueous alkaline phase has been separated off. The organic polycarbonate-containing solution contains further small amounts of aqueous alkaline phase (approx. 1%) and catalyst, for example a tertiary amine. The subsequent reaction of the polycarbonate with the aryl chlorocarbonate is effected in a residence time of 5–60 seconds. Longer reaction times no longer lead to a further decrease in the phenolic OH content. After this subsequent reaction, the mixture is washed and worked up in the customary manner.

Compared with corresponding polycarbonates prepared without subsequent reaction with aryl chlorocarbonates, the polycarbonates obtainable in this manner have a substantially lower content of terminal phenolic OH groups and a substantially improved thermostability and stability to hydrolysis.

By the process according to the invention, virtually OH group-free polycarbonates of uniform molecular weight ($\overline{M}_w : \overline{M}_n = 1.8-2.5$) are obtained in reaction times which are at most only 1 minute longer compared to the customary process. A further stage for the reaction of excess chlorocarbonic acid esters with alcohols or phenols is not required. The polycarbonates according to the invention are free of hydrolysable chlorine.

Diphenols of the formula (I) which preferably contain 6 to 30 C atoms are understood as meaning both mononuclear and polynuclear diphenols which can contain hetero-atoms and can be substituted. The following are examples of suitable diphenols: hydroquinone, resorcinol, dihydroxydiphenyls, bis-(hydroxyphenyl)-alkanes, bis-(hydroxyphenyl)-cycloalkanes, bis-(hydroxyphenyl)-sulphides, bis-(hydroxyphenyl)-ethers, bis-(hydroxyphenyl)-ketones, bis-(hydroxyphenyl)-sulphoxides, bis-(hydroxyphenyl)-sulphones and α,α'-bis-(hydroxyphenyl)-diisopropylbenzenes, and compounds thereof which are alkylated in the nucleus and halogenated in the nucleus. These and further suitable diphenols are described, for example, in U.S. Pat. Nos. 3,028,365, 2,999,835, 3,148,172, 2,991,273, 3,271,367 and 2,999,846, in the German Offenlegungsschriften (German Published Specifications) Nos. 1,570,703, 2,063,050, 2,036,052 and 2,211,956, the French Patent Specification No. 1,561,518, and in the monograph "H. Schnell, Chemistry and Physics of Polycarbonates, Interscience Publishers, New York, 1964".

Examples of preferred diphenols are: 4,4'-dihydroxydiphenyl, 2,2-bis-(4-hydroxyphenyl)-propane, 2,4-bis-(4-hydroxyphenyl)-2-methylbutene, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2-bis-(3,5-dimethyl-4-hydroxyphenyl)-propane, bis-(4-hydroxyphenyl)-sulphone, bis-(3,5-dimethyl-4-hydroxyphenyl)-sulphone, 2,4-bis-(3,5-dimethyl-4-hydroxyphenyl)-2-methylbutane, 1,1-bis-(3,5-dimethyl-4-hydroxyphenyl)-cyclohexane, α,α'-bis-(3,5-dimethyl-4-hydroxyphenyl)-p-diisopropylbenzene, 2,2-bis-(3,5-dichloro-4-hydroxyphenyl)-propane and 2,2-bis-(3,5-dibromo-4-hydroxyphenyl)-propane.

Examples of particularly preferred diphenols are: 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane and bis-(4-hydroxyphenyl)-sulphone.

Any desired mixtures of the abovementioned diphenols may also be used.

In order to improve the flow properties small amounts, preferably amounts between 0.05 and 2.0 mol%, relative to the structural units Z, of compounds which are trifunctional or more than trifunctional, in particular those having three or more than three phenolic hydroxyl groups, can also be used concomitantly. Examples of some of the compounds which can be used and which have three or more than three phenolic hydroxyl groups are phloroglucin, 4,6-dimethyl-2,4,6-tri-(4-hydroxyphenyl)-hept-2-ene, 4,6-dimethyl-2,4,6-tri-(4-hydroxyphenyl)-heptane, 1,3,5-tri-(4-hydroxyphenyl)-benzene, 1,1,1-tri-(4-hydroxyphenyl)-ethane, tri-(4-hydroxyphenyl)-phenylmethane, 2,2-bis-[4,4-bis-(4-hydroxyphenyl)-cyclohexyl]-propane, 2,4-bis-(4-hydroxyphenyl-isopropyl)-phenol, 2,6-bis-(2-hydroxy-5'-methyl-benzyl)-4-methylphenol, 2-(4-hydroxyphenyl)-2-(2,4-dihydroxyphenyl)-propane, hexa-(4-(4-hydroxyphenylisopropyl)-phenyl)-ortho-terephthalate, tetra-(4-hydroxyphenyl)-methane, tetra-(4-(4-hydroxyphenylisopropyl)-phenoxy)-methane and 1,4-bis-((4',4"-dihydroxytriphenyl)-methyl)-benzene. Some other trifunctional compounds are 2,4-dihydroxybenzoic acid, trimesic acid, cyanuric chloride and 3,3-bis-(3-methyl-4-hydroxyphenyl)-2-oxo-2,3-dihydroindole.

The 0.05 to 2 mol%, relative to structural units Z, of branching agents to be used concomitantly if appropriate can either be initially introduced with the diphenols into the aqueous alkaline phase, or can be added together with the chain terminators in solution in the organic solvent, before the phosgenation.

Instead of the diphenols of the formula (I), their mono- and/or bis-chlorocarbonic acid esters can also be used concomitantly, these compounds being added in the form of solutions in organic solvents.

Suitable monophenolic molecular weight regulators, which are employed in the amounts mentioned at the outset, are phenol and/or substituted monophenols, such as 2,6-dimethylphenol, p-tert.-butylphenol or 4-(1,1,3,3-tetramethyl-butyl)-phenol.

The compounds of formula (II) which can be used for reducing the phenolic OH content of polycarbonates are the chlorocarbonic acid esters of the monophenols customarily used as chain interrupters, for example the chlorocarbonic acid esters of phenol, p-tert.-butylphenol, 2,6-dimethylphenol or 4-(1,1,3,3-tetramethylbutyl)-phenol. The monophenols which are employed as chain interrupters at the beginning of the reaction and the monophenols on which the chlorocarbonic acid esters used for the subsequent reaction are based can be identical or different.

The amount of chain interrupter and of branching agent depends, as already mentioned, on mols of structural units Z which result from the diphenols of the formula (I) and the chlorocarbonic acid esters thereof, but when chlorocarbonic acid esters of the diphenols (I) are used, the amount of phosgene can be correspondingly reduced in a known manner; otherwise, it is customarily about 1.1 to 1.5 moles per mol of diphenol employed.

Methylene chloride, chlorobenzene and mixtures of methylene chloride and chlorobenzene are used, for example, as the organic phase for the phase boundary polycondensation.

The preparation of the polycarbonates according to the invention by the phase boundary process can be catalysed in the customary manner by catalysts such as tertiary amines, in particular tertiary aliphatic amines, such as, for example, tributylamine, triethylamine or N-ethylpiperidine; the catalysts can be employed in amounts of 0.05-20 mol%, relative to mols of structural units Z. The catalysts can be added before the beginning of phosgenation, or during or even after the phosgenation.

The isolation of the polycarbonates obtainable according to the invention is effected in a known manner, as follows: after the subsequent reaction according to the invention, the organic phase is first washed until it is alkaline, for example with dilute sodium hydroxide solution, then washed until it is acidic, for example with dilute phosphoric acid, and then washed until it is neutral, the phases are separated, and after the organic phase has been dried, it is worked up either by evaporating the organic solvent or by adding a precipitating agent. The polycarbonate obtainable according to the invention can be moulded into any desired shaped articles, for example into films.

To modify the polycarbonates obtainable according to the invention, it is possible to add substances such as, for example, carbon black, silica, kaolin, clays, $CaF_2$, $CaCO_3$, aluminas, glass fibres and inorganic pigments, both as fillers and as nucleating agents. They can likewise contain the mould-release agents customary for polycarbonate, such as, for example, glycerol tristearate. In the examples which follow, $\eta rel$ is measured in $CH_2Cl_2$ at 25° C. and a concentration of 0.5% by weight.

The determination of the terminal phenolic OH groups in the polycarbonate is effected according to the $TiCl_4$ method, as described by A. Horbach, U. Veiel and H. Wunderlich in "Die makromolekulare Chemie" (Macromolecular Chemistry), vol. 88, page 215 et seq. (1965). The method for the determination of the hydrolysable chlorine in the polycarbonate is also described in the same publication.

EXAMPLE 1 (COMPARISON)

Polycarbonate prepared using phenol as a chain interrupter.

A solution is prepared from 3.42 kg (15 mols) of 2,2-bis-(4-hydroxyphenyl)-propane (bisphenol A), B 46.6 g of phenol (3.3 mol%), 2.75 kg of 45% strength aqueous sodium hydroxide solution and 16 l of distilled water. After 36.5 kg of methylene chloride have been added, 2.83 kg of phosphene are passed into the mixture in the course of 1 hour, while stirring intensively at 20°-25° C. By adding a further amount of 6.5% strength sodium hydroxide solution (24 kg) in the course of the phosgenation, the pH value is kept at 13-14. 15.2 g (1 mol%) of triethylamine are then added, and the mixture is stirred for a further 30 minutes at pH 13-14. The bisphenolate-free aqueous phase is separated off, and the organic phase is acidified with 2% strength phosphoric acid and washed with water until it is free of electrolyte. The solvent is substantially distilled off, and the polycarbonate is extruded via a devolatilisation extruder, and is granulated. The polycarbonate has a relative solution viscosity ($\eta rel$) of 1.290, and a phenolic OH content of 250 ppm.

EXAMPLE 2

Polycarbonate prepared using phenol as a chain interrupter, and subsequent reaction with phenyl chlorocarbonate.

A polycarbonate is prepared from bisphenol A and 3.3 mol% of phenol, as described in Example 1. After the aqueous alkaline phase has been separated off, the organic phase, which still contains approx. 1% by weight of the aqueous alkaline phase, is divided into 6 equal portions, each containing 635 g of polycarbonate, and the portions are processed further in different ways.

(a) Working-up as in Example 1 (without subsequent reaction with phenyl chlorocarbonate) (b-g) Varying amounts of phenyl chlorocarbonate, as a 20% strength solution in methylene chloride, are added, and thorough mixing is effected for 10-60 seconds. The mixture is then acidified with 2% strength phosphoric acid, and is worked up further as described in Example 1.

The relative solution viscosity of the polycarbonates from Example 2 is 1.285. The phenolic OH contents are summarised in Table 1.

TABLE 1

Phenolic OH content of the polycarbonates from Example 2 as a function of the amount of phenyl chlorocarbonate and the reaction time

| Example | Phenyl g | chloro-carbonate (mol %, relative to 230 ppm of OH) | Subsequent reaction time (sec.) | Phenolic OH (ppm) | Hydrolysable chlorine (ppm) |
|---|---|---|---|---|---|
| 2a | — | — | — | 230 | <2 |
| 2b | 1.04 | 75 | 30 | 110 | <2 |
| 2c | 1.38 | 100 | 30 | 70 | <2 |
| 2d | 2.07 | 150 | 30 | 30 | <2 |
| 2e | 2.76 | 200 | 30 | 20 | <2 |
| 2f | 2.07 | 150 | 10 | 35 | <2 |
| 2g | 2.07 | 150 | 60 | 30 | <2 |

Comparative Example 2h

The experiment is carried out according to 2d, using benzoyl chloride instead of phenyl chlorocarbonate:

1.86 g (150 mol%, relative to phenolic OH) of benzoyl chloride (as a 20% strength solution in methylene chloride) are added to a solution of 635 g of polycarbonate having a phenolic OH content of 230 ppm, and thorough mixing is effected for 30 seconds, as described in Example 2.

The polycarbonate ($\eta_{rel}$=1.285) obtained after the working-up has a phenolic OH content of 230 ppm; hydrolysable chlorine = <2 ppm.

This means that no reduction in the phenolic OH content is effected by subsequent reaction with benzoyl chloride.

EXAMPLE 3

Polycarbonate prepared using phenol as a chain interrupter, and subsequent reaction with phenyl chlorocarbonate.

A polycarbonate is prepared from bisphenol A and 3.3 mol% of phenol, as described in Example 1. After the aqueous alkaline phase has been separated off, a solution of 2.0 g of phenyl chlorocarbonate in 10 ml of methylene chloride is stirred in, while stirring intensively. After a reaction time of 60 sec., the mixture is acidified with 2% strength phosphoric acid, and is worked up as in Example 1. The resulting polycarbonate has a relative solution viscosity $\eta\text{rel} = 1.288$, and a phenolic OH content of 25 ppm.

The polycarbonates from Example 1 and Example 3 are processed to give samples, and (a) the light transmission according to DIN No. 5033 and DIN 4646 is measured with the aid of a spectrophotometer at 420 nm and a layer thickness of 4 mm after tempering at 140° C., and (b) the stability to hydrolysis is measured by storing standard small bars in hot water at 100° C.

The values are reproduced in Tables 2 and 3.

TABLE 2

Light transmission by 4 mm thick polycarbonate platelets at 420 nm after tempering at 140° C.

| Polycarbonate according to Example | Tempering at 140° C. | | | | |
|---|---|---|---|---|---|
| | 0 | 6 | 12 | 24 | 48 |
| 1 (comparison) | 84.0 | 83.5 | 82.7 | 81.4 | 78.2 |
| 3 | 86.5 | 86.3 | 85.8 | 85.0 | 83.2 |

TABLE 3

Storage of standard small bars in hot water at 100° C. Impact strength and relative viscosity as a function of the boiling time

| Boiling time in (hours) | | Example 1 | Example 3 |
|---|---|---|---|
| Start | $\eta$rel | 1.290 | 1.288 |
| | $a_n$ (kJ/m$^2$) | not broken | not broken |
| 200 | $\eta$rel | 1.282 | 1.285 |
| | $a_n$ | not broken | not broken |
| 400 | $\eta$rel | 1.262 | 1.278 |
| | $a_n$ | 7 × not broken 3 × 99 | not broken |
| 700 | $\eta$rel | 1.252 | 1.270 |
| | $a_n$ | 5 × not broken 5 × 76 | not broken |
| 1,000 | $\eta$rel | 1.240 | 1.265 |
| | $a_n$ | 4 × not broken | 9 × not broken |
| | | 6 × 54 | 1 × 90 |

We claim:

1. A process for the preparation of a polycarbonate resin having a weight average molecular weight of at least 10,000 as determined by gel chromatography comprising reacting:
   (A)
   (i) at least one member selected from the group consisting of diphenols of the formula (I) HO—Z—OH wherein Z is a divalent aromatic radical and chlorocarbonic acid esters of a diphenol,
   (ii) about 0.1 to 8 mol % of phenol or a substituted monophenol and
   (iii) phosgene, in an organic solvent and an aqueous alkaline phase to produce a polycarbonate resin, and reacting
   (B) the polycarbonate resin of said (A) in solution in the organic phase after the aqueous alkaline phase has been separated off and before any acidic wash with about 0.1 to 1 mol % of at least one aryl chlorocarbonate of the formula (II)

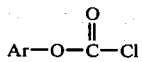

wherein Ar denotes a monovalent aromatic radical, said percents being relative to the mols of said (i).

2. A process according to claim 1 wherein the mol % of said (II) is 0.15 to 0.5 mol %.

3. A process according to claim 1, in which Z denotes, a divalent aromatic radical which contains 6 to 30 carbon atoms.

4. A process according to claim 1 wherein the mol % of (ii) is 0.5 to 5 mol %.

5. A process according to claim 1, in which Ar denotes a phenyl radical or an alkylphenyl radical having 1 to 8 carbon atoms in the alkyl radical.

6. A process according to claim 1, in which the aryl chlorocarbonate is added to the polycarbonate in the form of a solution in methylene chloride, toluene or chlorobenzene.

7. A process according to claim 1, in which the diphenol of formula (I) is selected from 2,2-bis-(4-hydroxyphenyl)-propane, 2,2-bis-(3,5-dimethyl-4-hydroxyphenyl)-propane, 2,2-bis-(3,5-dichloro-4-hydroxyphenyl)-propane, 2,2-bis-(3,5-dibromo-4-hydroxyphenyl)-propane, 1,1-bis-(4-hydroxyphenyl)-cyclohexane or bis-(4-hydroxyphenyl)-sulphone.

8. A process according to claim 1, in which the aryl chlorocarbonate of formula (II) is selected from the chlorocarbonic acid esters of phenol, p-tert.-butylphenol, 2,6-dimethylphenol or 4-(1,1,3,3-tetramethylbutyl)-phenol.

* * * * *